Jan. 26, 1965    C. P. PARK    3,167,168

ELECTROMAGNETIC CONVEYOR

Filed Aug. 15, 1963

*INVENTOR*
*Chester P. Park.*

United States Patent Office 3,167,168
Patented Jan. 26, 1965

3,167,168
ELECTROMAGNETIC CONVEYOR
Chester P. Park, 424 King George Road,
Cherry Hill, N.J.
Filed Aug. 15, 1963, Ser. No. 302,260
1 Claim. (Cl. 198—31)

This invention relates to material-handling equipment and, more particularly, to that piece of material-handling equipment known as a conveyor, a device which, as its name implies, conveys a number of articles from one place to another without continuous manual handling of the articles to be moved. Factories, and assembly and packaging plants are the three largest users of conveyors in one form or another.

Conveyors can be operated by every easily controlled source of power known to man, such as internal combustion and steam engines, air, liquid, and, of course, electricity that usually operates motors which are adapted to rotate belts, chains, or gears in one form or other; however, some attempts have been made to harness electricity to operate electromagnetic conveyors. This most recent method of material-handling has to date met with but questionable success. The device has either been too complicated or else subject to shorts in its wiring that shock its operators.

One of the greatest uses of conveyors today is in the transportation of cans in food processing plants and the like, particularly metal cans, which naturally are heavier than cardboard or plastic containers. It is for this particular use that this invention is best adapted although it is also of use where lubricants are placed in metal cans and packaged.

From the foregoing statements it can be seen that the principal object of this invention is to provide an electromagnetic conveyor that operates, as will be hereinafter shown, on an entirely new concept of the use of electricity to move metal cans efficiently and safely along a given path.

Another object of this invention is to provide an electromagnetic conveyor on which metal cans can be moved, stopped, or deflected without the use of mechanical mechanism such as cables, chains, belts, wheels, flights or mechanical deflectors.

Another object of this invention is to provide an electromagnetic conveyor that will have a more instantaneous control than is possible on a cable or belt conveyor where it is next to impossible to prevent a certain amount of friction or slippage, particularly if the device is even partly or only slightly inclined.

Another object of this invention is to provide an electromagnetic conveyor that can embody an enclosed compartment constructed from non-magnetic material, a compartment which may be pressurized, have a predetermined and necessary temperature difference, or contain sprays for washing, or painting of the cans as they pass through the same.

Another object of this invention is to provide an electromagnetic conveyor that requires little or no maintenance for its continued operation.

Another object of this invention is to provide an electromagnetic conveyor that does not have rollers, pulleys, or sprockets and the like requiring adjustment or replacement from time to time.

Still another object of this invention is to provide an electromagnetic conveyor on which the metal cans or other objects being moved cannot become bunched at the bottom of inclines and thus cause jams that must be broken manually, a time-consuming operation, to say the least.

These and other objects will in part be obvious and will in part be hereinafter more fully disclosed.

In the drawings which show by way of illustration one embodiment of the invention, FIGURE 1 is a top view of a portion of a typical installation of this invention with its wiring shown in semi-diagrammatic form.

Figure 1:
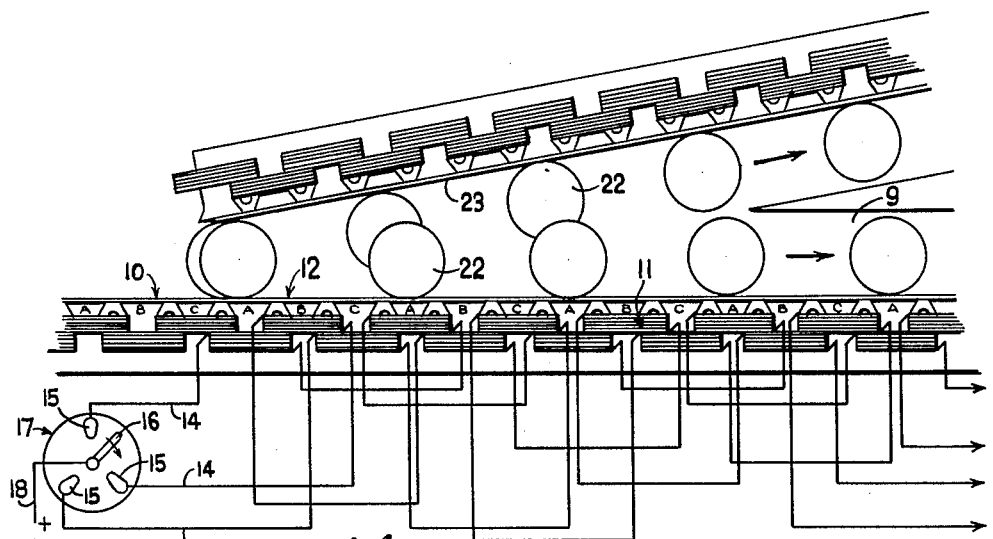
Figure 2:
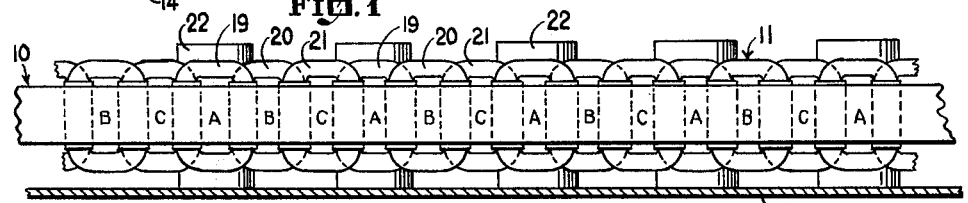
FIGURE 2 is a side view of FIGURE 1 and without any of the electric wiring being shown.

There is herein described a typical electromagnetic conveyor constructed to operate according to the concepts of this invention which embodies a flat surface 9 of any desired length on which are placed metal cans or other containers in an upright position, and a laminated iron side member 10 which is, in effect, a core and which contains a plurality of vertical recesses horizontally spaced to receive the sides of the elongated O-shaped coils of electric wire which is herein characterized by the reference numeral 11 to indicate the coils in general although it will be seen later on in this specification that it is necessary to indicate the aforesaid coils in a given order so as to explain the way in which this invention works. The aforesaid coils of electric wire 11 are placed in two rows one behind the other and in alternate positions, as clearly shown in FIGURE 1 of the drawing.

Figure 5:
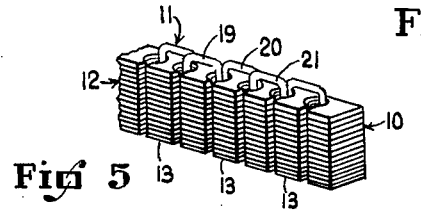
FIGURE 5 is a perspective view of a portion of that part of this invention known as the stators.

Looking now at FIGURE 5 of the appended drawing, it will be seen that the face 12 of the aforesaid side member 10 is actually divided up into a plurality of equally sized and spaced rectangular members herein called the poles 13.

Figure 4:
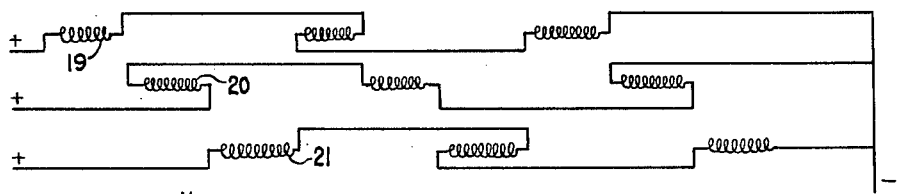
FIGURE 4 is a schematic circuit diagram of this invention.

Referring once again to FIGURE 1 and also, for the first time, to FIGURE 4 of the accompanying drawing, it will be seen that each one of the coils of electric wire 11 are connected to the others in a plurality of positive series that have their input wires 14 connected to the contact points 15 of a distributor 17 which has a rotating arm 16 in the center thereof and which is connected to a source of D.C. electric current by means of a single wire 18 (FIGURE 1).

Attention should be called at this point to the fact that the above described side member (core) 10, and the coils of electric wire 11 are actually a stator when assembled. The stator is not characterized by any reference number on the appended drawing since it is for all practical purposes the same thing as that previously called a side member and indicated by the reference number 10. The way in which this invention of an electromagnetic conveyor works is quite simple and easily understood at a glance by any electrical engineer or person having a working knowledge of electricity. When electricity is sent through the coils of electric wire 11 in frequencies in the order of the coils 19, 20 and 21 (FIGURE 5), and so on down the entire length of the conveyor, the cans which are of course made from any magnetic attracting material will accordingly be moved along the length of the conveyor. The speed at which the cans are moved will of course depend upon the frequency of the impulses of electric current passing through the coils of electric wire which, of course, momentarily magnetize each one of the poles 13 and thus attract the side of the metal can to the same by the moving of the magnetic field.

Deflection of cans, which is herein designated for the first time by the reference numeral 22, to a branch line of the conveyor is accomplished merely by mounting another stator on the opposite side of the conveyor and in the desired direction as shown in FIGURE 1 of the drawing, where the second side member (stator) is characterized in its entirety by the reference numeral 23. A double throw relay (not shown in the drawing) is connected in the electric circuit in the usual manner when the conveyor embodies a branch line. At the actual point of change in direction of travel of the cans one stator is deenergized and the other stator energized at the same instant by means of the aforesaid double throw relay.

The previously mentioned distributor 17 can, of course, be activated by any desired means, none of which is an actual part of this invention and is, therefore, not shown in the drawing nor further mentioned in this specification.

It has been stated in the fourth object of this invention that it embodies a closed side compartment through which the cans 22 pass. The cans or any other object to be conveyed on this novel conveyer must naturally be made from electric magnetic attracting material, or at least the sides of the objects must be of this material.

Figure 3:
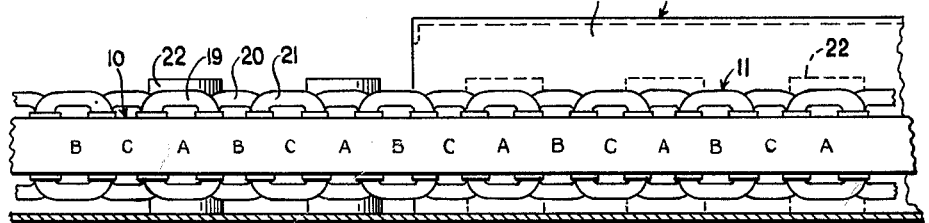
FIGURE 3 is a side view of this invention similar to that of FIGURE 2 but with a portion of the compartment through which the cans are conveyed.

This feature of the invention, that is, the closed side compartment, is shown in FIGURE 3, where it is seen that the compartment 24 is located outside of the aforesaid side number 11 and that the cans 22 pass through the aforesaid compartment 24 which, having non-metallic sides 25, will not affect the magnetic pull of the invention when the electricity is turned on.

From the foregoing it will be seen that this invention is one well adapted to attain all of the ends and objects hereinbefore set forth, together with other advantages which are obvious and which are inherent to the structure.

It will be understood that certain features and subcombinations are of utility and may be employed without reference to other features and subcombinations. This is contemplated by and is within the scope of the appended claim.

It is understood that sheet insulation is inserted whereever necessary, between the aforesaid coils of electric wire and the laminated side member 10, as will be well understood by those experienced in any of the electrical arts.

Inasmuch as various possible embodiments of the invention may be made without departing from the scope thereof, it is to be understood that all matter herein set forth or shown in the accompanying drawings is to be interpreted as illustrative and not in a limiting sense.

Having thus described my invention, what I claim as new and desire to secure by United States Letters Patent is:

An electromagnetic conveyor of the character described, comprising a flat surface of any desired length on which objects made of magnetic attracting material are placed for transportation from one place to another and a vertically mounted stator, mounted on one side of the said flat surface, the said stator embodying a plurality of equally spaced O-shaped coils of electric wire mounted in a core of laminated iron members that is provided with a plurality of vertically disposed recesses therein in equally spaced relation to each other, the portion between each two of the recesses being the poles of the said stator, and the said stator being of the same length as that of the said flat surface, and wires connecting the said stator to any desired source of direct current, thereby activating the said stator through a rotated distributor embodying a separate contact point connected to one of the said coils of electric wire and a rotating arm having its outer end in contact with each one of the said contact points as it rotates and the center of the said rotating arm being connected to the positive connection of a source of direct electric current while the negative connection of the said electric current is connected to the other wire of each said coil of electric wire in a way that will produce longitudinal travel of the said objects and a closed, sided compartment of non-magnetic material encompassing the conveyor in a way that will permit the said stator being located outside the said compartment while the said objects pass through the said compartment, and a second section of the said electromagnetic conveyor being mounted at an angle from the first mentioned electromagnetic conveyor to which one end is adapted, thereby providing a different path for the said objects to be moved according to one's needs.

References Cited by the Examiner
UNITED STATES PATENTS

| | | | |
|---|---|---|---|
| 1,051,056 | 1/13 | Bachelet | 198—41 X |
| 1,871,446 | 8/32 | Decker | 310—12 X |
| 2,838,160 | 6/58 | Rouse | 198—31 |
| 3,113,042 | 12/63 | Hall | 198—41 X |

SAMUEL F. COLEMAN, *Primary Examiner.*

EDWARD A. SROKA, *Examiner.*